June 28, 1966

W. E. DAVIS 3,258,141

TOBACCO HARVESTERS WITH ROTATABLE FRAME AND RADIAL
CONVEYORS FOR CENTRAL AREA DELIVERY

Filed June 12, 1963

INVENTOR

William E. Davis

BY Munn, Hall & Pollock

ATTORNEYS

June 28, 1966 W. E. DAVIS 3,258,141
TOBACCO HARVESTERS WITH ROTATABLE FRAME AND RADIAL
CONVEYORS FOR CENTRAL AREA DELIVERY
Filed June 12, 1963 7 Sheets-Sheet 2
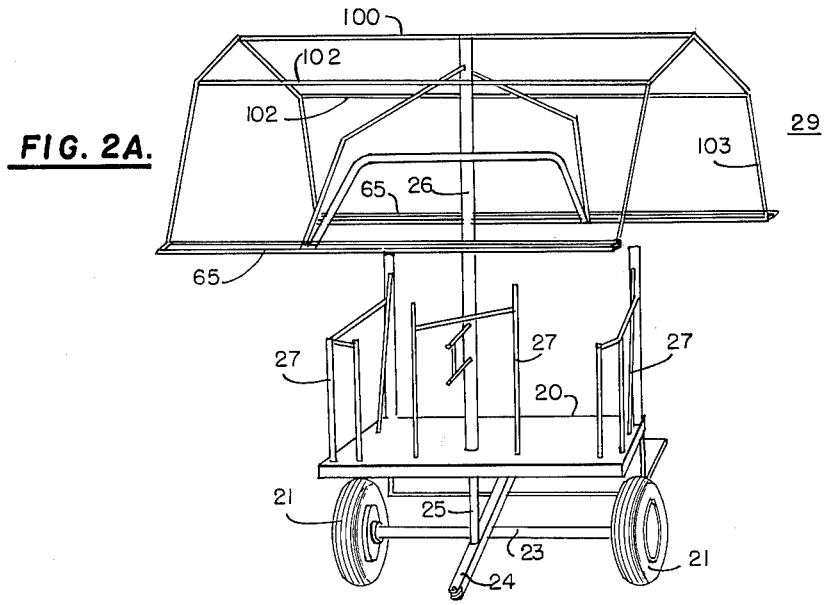
FIG. 2A.
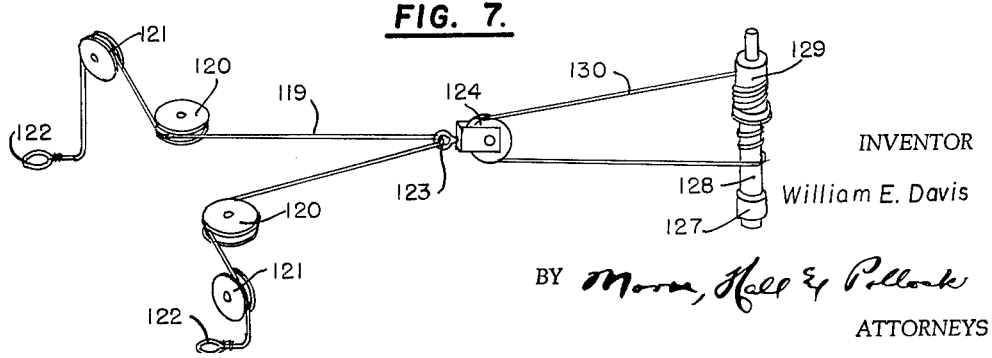
FIG. 5.
FIG. 7.
INVENTOR
William E. Davis
BY *Morris, Hall & Pollock*
ATTORNEYS

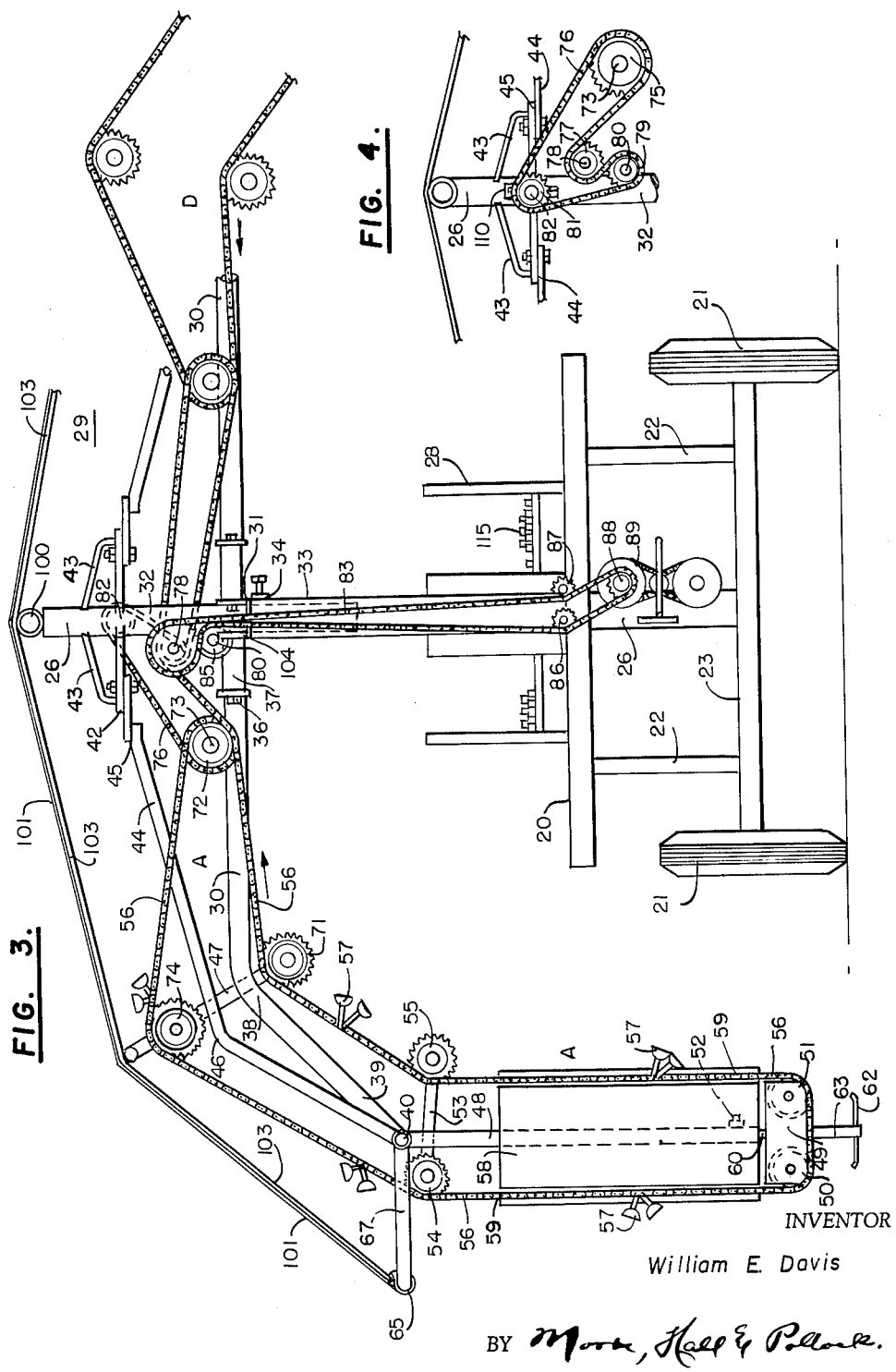

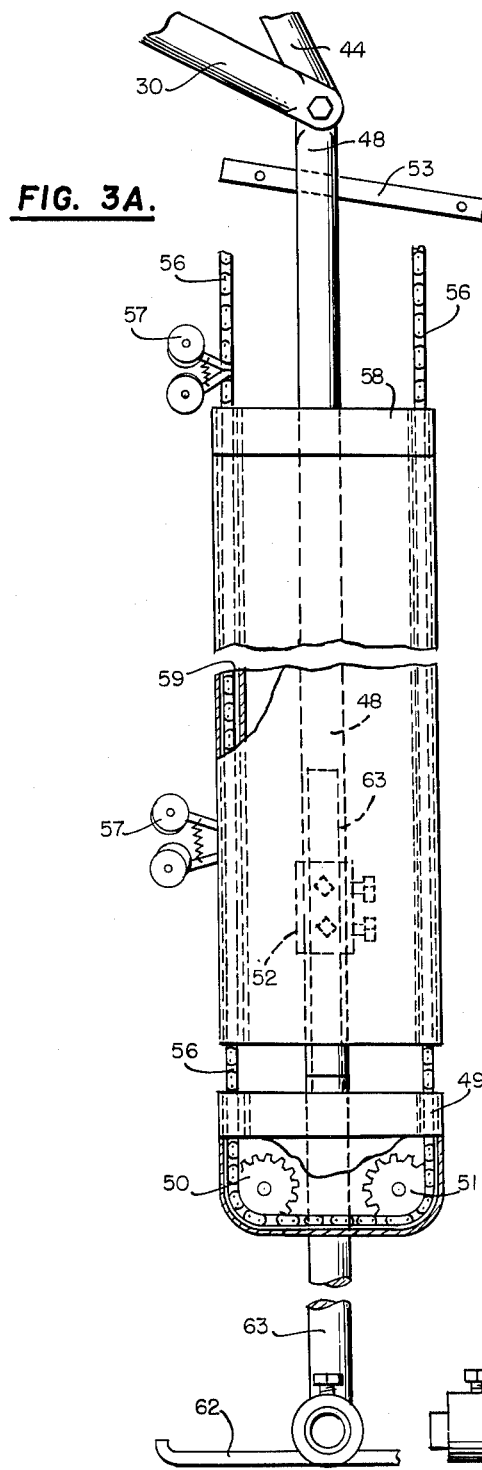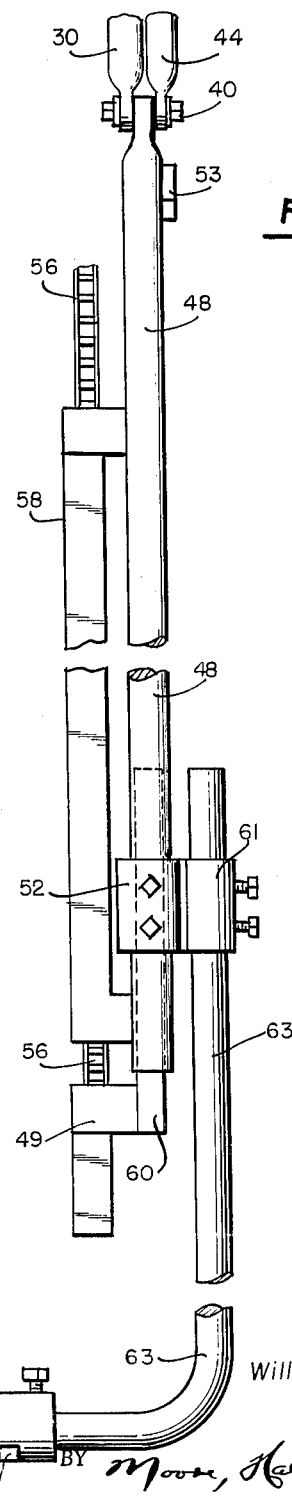

June 28, 1966 W. E. DAVIS 3,258,141
TOBACCO HARVESTERS WITH ROTATABLE FRAME AND RADIAL
CONVEYORS FOR CENTRAL AREA DELIVERY
Filed June 12, 1963 7 Sheets-Sheet 5
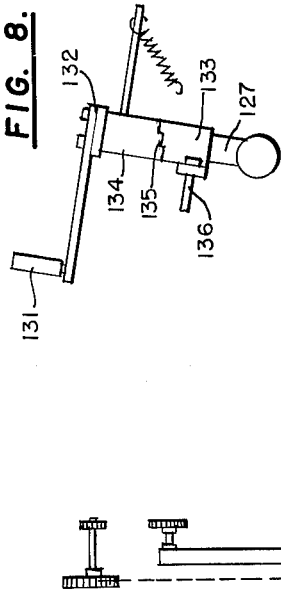
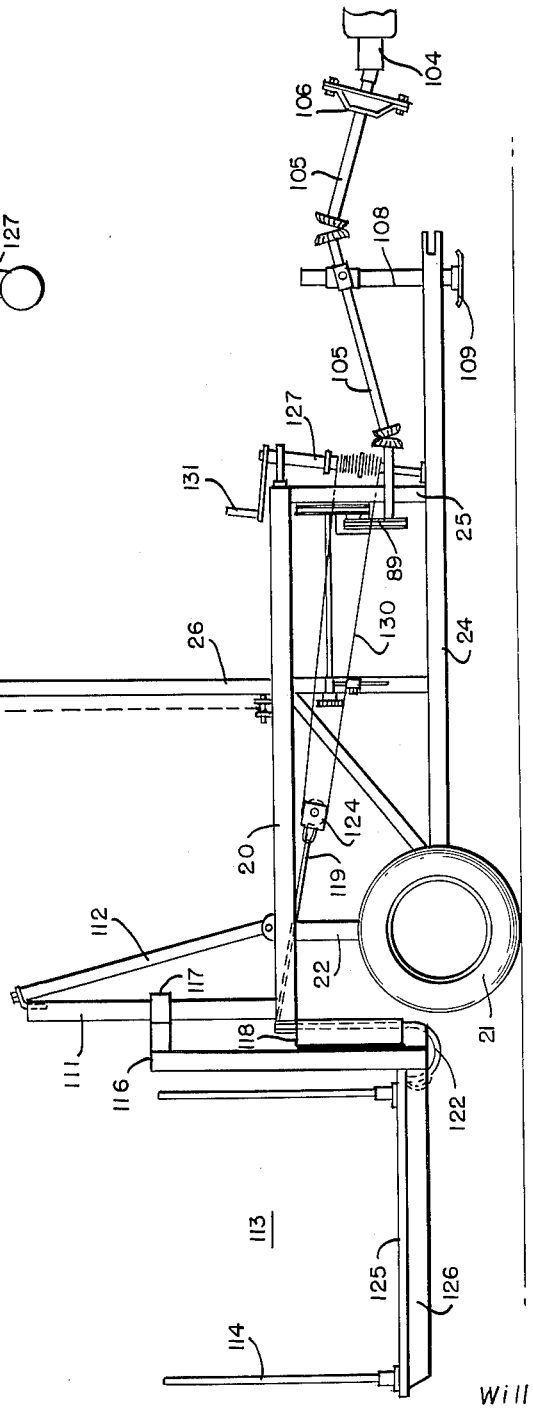
INVENTOR
William E. Davis
BY
ATTORNEYS June 28, 1966 W. E. DAVIS 3,258,141
TOBACCO HARVESTERS WITH ROTATABLE FRAME AND RADIAL
CONVEYORS FOR CENTRAL AREA DELIVERY
Filed June 12, 1963 7 Sheets-Sheet 6
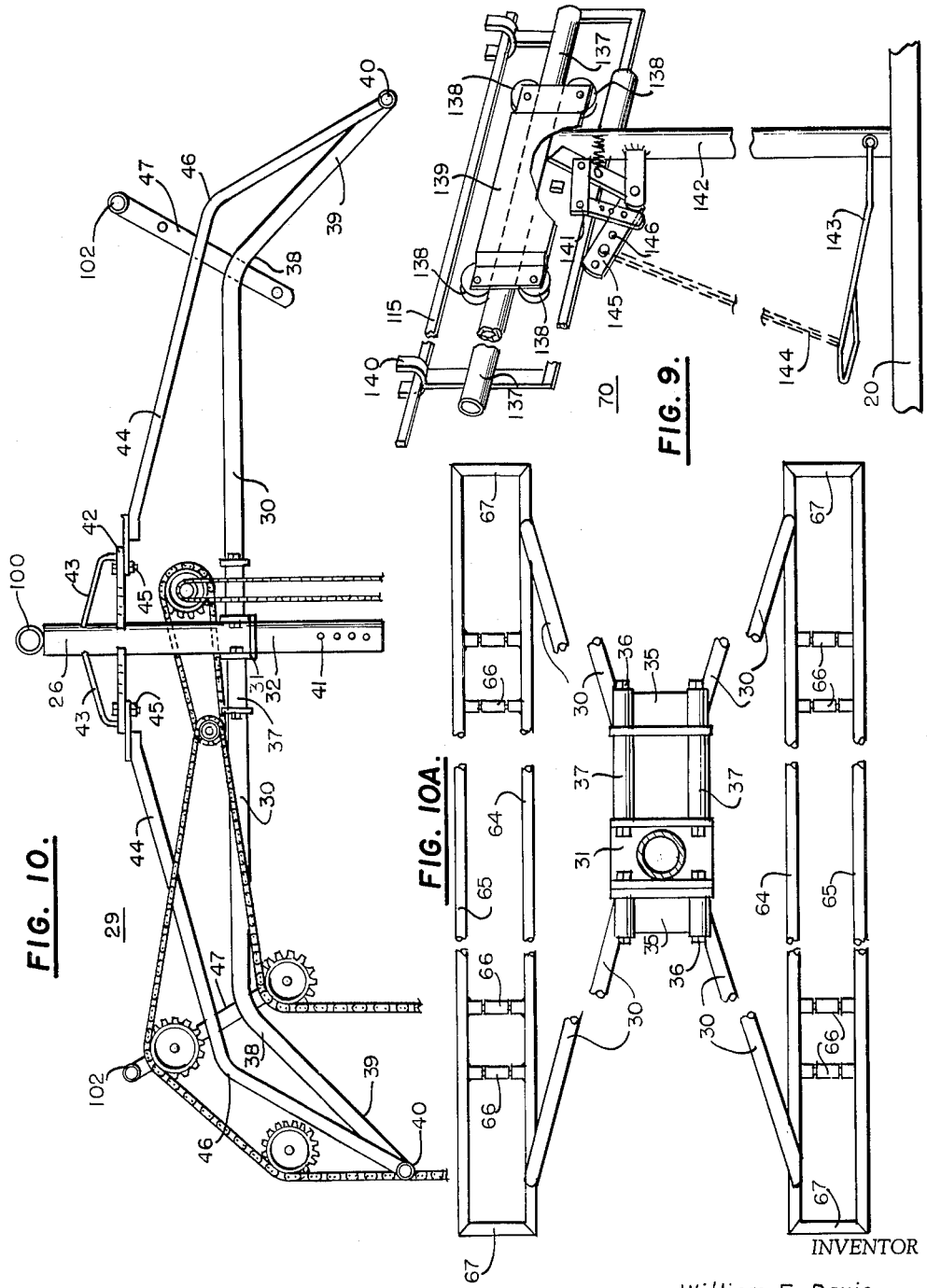
INVENTOR
William E. Davis
BY Moore, Hall & Pollock
ATTORNEYS

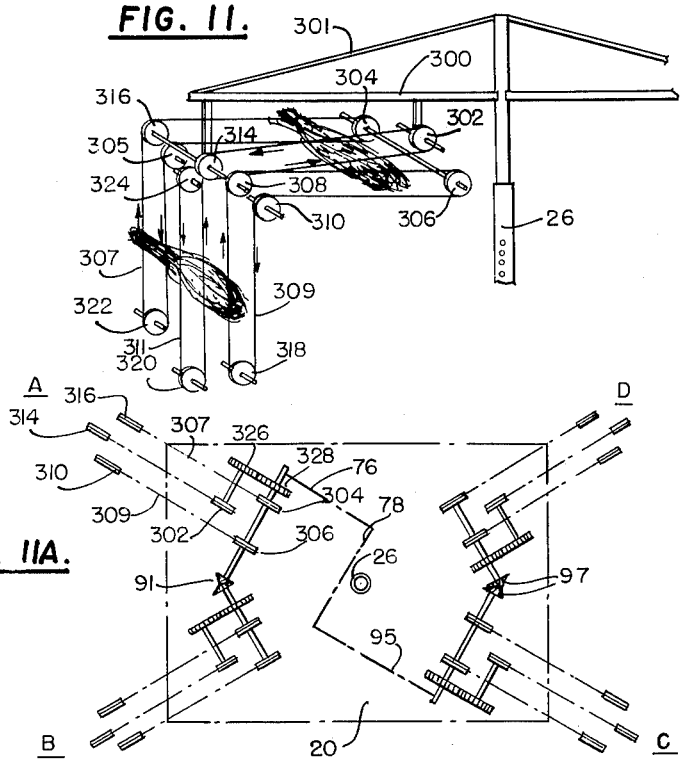
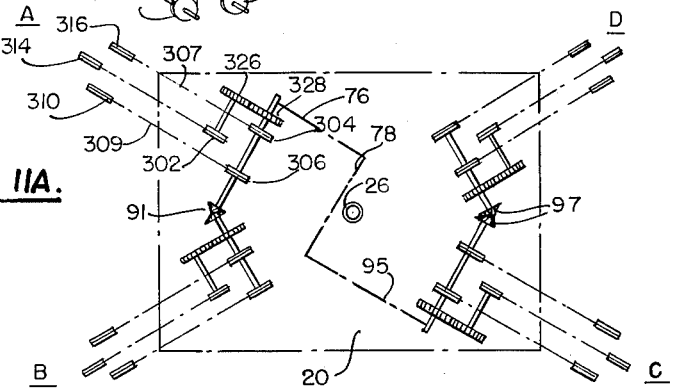
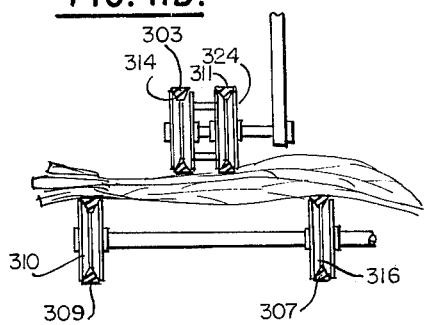
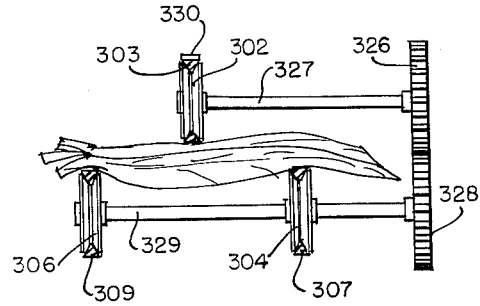

United States Patent Office 3,258,141
Patented June 28, 1966

3,258,141
TOBACCO HARVESTERS WITH ROTATABLE
FRAME AND RADIAL CONVEYORS FOR
CENTRAL AREA DELIVERY
William E. Davis, Seven Springs, N.C.
Filed June 12, 1963, Ser. No. 287,329
12 Claims. (Cl. 214—83.1)

The present invention relates to tobacco harvesters with a rotatable frame supported by a central post and radial conveyor chains for central area delivery.

Reference is made to my prior basic patents U.S. Patents Nos. 2,715,968 of August 23, 1955, and 2,786,-585 of March 26, 1962, granted to me on applications for Tobacco Harvesters invented jointly with Alton Scott and Oliver W. Scott, and also by U.S. Patent No. 2,954,-132 for Tobacco Harvester With Automatic Looping Mechanism, granted September 27, 1960, and U.S. Patent No. 3,034,664 for Tobacco Harvesters granted May 15, 1962, for background in the art.

It is an object of the invention to provide a rotatable turret head harvester of rectangular outline having one relatively long dimension for straddling rows of tobacco and a relatively short dimension which meets the clearance requirements for highway transportation. The turret head is rotated to make the long dimension transverse to the direction of motion when the harvester is in the field harvesting tobacco leaves and the short dimension transverse to the direction of motion when the harvester is moved from field to field along a road or highway.

It is an object of the invention to provide radially mounted conveyor chains for central area delivery of tobacco hands or bundles, so that the harvester may be operated with a minimum of workers when the yield is relatively light or the tobacco is handled in bulk.

Other objects are set forth in the above mentioned patents and will appear from the following description.

In the drawing like numerals refer to like parts throughout:

FIGURE 2A is a view similar to FIGURE 2, but with parts removed for clarity and the turret head rotated into harvesting position.

FIGURE 3 is a skeleton elevation with the rotatable head in harvesting position and showing details of the conveyor chain mounting and drive.

FIGURE 3A is a fragmentary elevation of conveyor chain tension control.

FIGURE 3B is a side view of FIGURE 3A.

FIGURE 4 is a fragmentary detail of the chain drive shown in FIGURE 3, as viewed from the rear of FIGURE 3.

FIGURE 5 is an enlarged fragmentary view of the conveyor drive details, looking down from the top.

FIGURE 6 is a side elevation of the harvester with parts removed to show drive and hoist details.

FIGURE 7 is a detail of the differential drum hoist for operating the rear platform.

FIGURE 8 is a detail of a brake construction for the drum hoist.

FIGURE 9 is a perspective view of one form of stick advancing mechanism.

FIGURE 10 is a schematic fragmentary showing in elevation of one arrangement of upper bracing and means for adjusting the harvester to varying row widths.

FIGURE 10A is a plan view of a part of FIGURE 10.

FIGURES 11, 11A, 11B and 11C show a modified form with belt conveyor means instead of conveyor chains.

Figure 1:
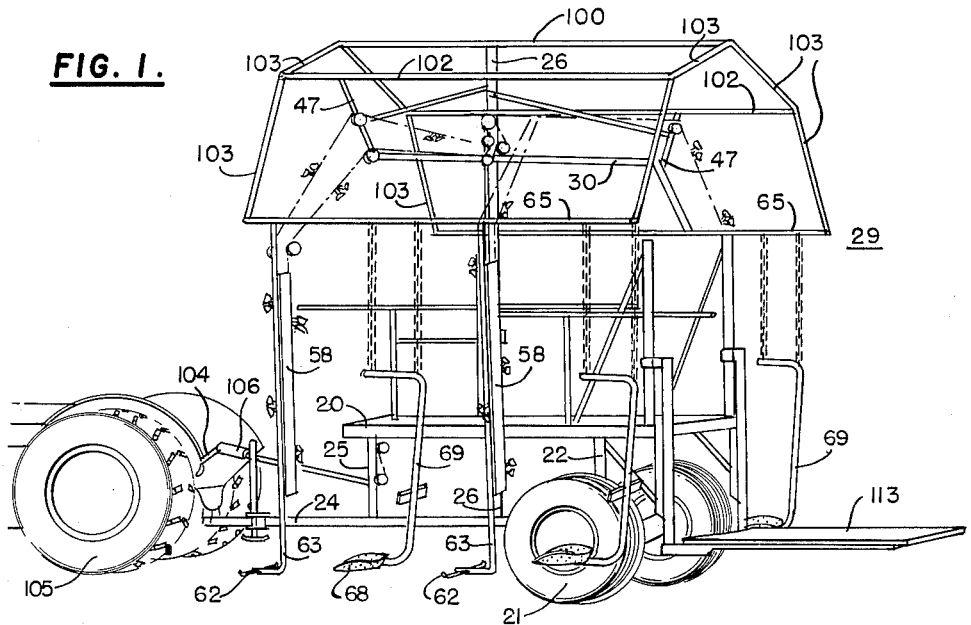
FIGURE 1 is a side cabinet projection of one form of the invention according to the invention.

The harvester comprises a raised platform 20 mounted on wheels 21 by means of struts 22 and cross member 23 which is provided with suitable wheel bearings at its ends. An elongated tongue 24 is attached to cross member 23 and extends forward of platform 20 which it supports by means of a forward post 25. The upright struts 22, forward post 25, cross member 23, and tongue 24 are suitably braced to provide a sturdy unitary structure. A central tubular column 26 of considerable strength, is heeled on tongue 24 forward of the wheels 21 and centrally of platform 20. Tubular column 26 is firmly anchored to tongue 24 and projects upwardly through the platform and to a height thereabove such that the assembly 29 carried thereby can be rotated readily.

Platform 20 mounts guard rails 27 and tobacco stick holder and advancing means 70 thereon together with suitable storage means 28 for reserve tobacco sticks.

Assembly 29 comprises four lower support arms 30 which are mounted on central column 26 by means of channel bracket 31 which is firmly attached to column 26 at a suitable height to provide adequate clearance. Bracket channel 31 is preferably adjustable on the column 26, but it is important that any such construction has a safety lock means below which it cannot fall. Such means might be provided by making the column 26 in two parts, 33 and 32, with the part 32 being slidable within the lower, larger part 33 so that in its lowest safe position the channel bracket 31 would rest upon the upper end of the larger tubular part 33 and prevent the assembly 29 from being lowered upon the heads of workers standing on platform 20 and assuring that the primer seats to be described below clear the ground at all times. A set screw 34 may be mounted on the side of the larger tubular member 33 adjacent its upper end and mate with spaced holes such as 41 in the telescopic portion 32 so as to lock the telescopic upper portion 32 and its assembly 29 in any raised position in which the channel bracket 31 would be spaced from the upper end of the larger tubular member 33.

The arms 30 terminate in pairs at angle members 35 which are bolted to channel bracket 31 by suitable through bolts 36. These parts are massive so as to withstand a considerable load and the arrangement is such that extension pieces 37 may be inserted between either or both of the angle members 35 and channel bracket 31 and firmly bolted into position. In this way allowance can be made for variation in the space between rows of tobacco when the harvester is used in the field. The arms 30 extend outwardly horizontally from the central post 26 until they are well clear of the platform 20 and are then bent downwardly as shown at 38. They have a lower outwardly slanting part 39 terminating at 40. The normal spacing between rows of tobacco is approximately 3½ feet and the platform 20, with its wheels 21, is dimensioned to give maximum working surface but still provide adequate clearance for the rows of tobacco plants. The termination points 40 on opposite sides of central post 26, are preferably spaced about eight feet apart so that the primers sitting in their suspended seats are approximately centrally located between the two adjacent rows of tobacco on opposite sides of the platform 20. As these rows of tobacco are about 3½ feet apart it will be seen that the harvester is intended to operate in a tobacco field planted according to an arrangement termed "Fifth Row Out"; that is to say, every fifth row of tobacco is omitted, providing a seven foot space for the harvester platform and wheels to pass through. Four rows of tobacco are harvested at one time, two on each side of the harvester, by primers suspended in seats positioned between the rows. On each succeeding trip through the field the harvester is moved down four rows and then drawn along the next row out. The two rows on each side of the row out are then harvested. With this arrangement maximum use of the land may be obtained and automatic labor saving machinery employed.

An upper support plate 42 is welded to upper section 32 of central column 26 and is anchored by suitable guy rods 43 which may be welded to support plate 42 and column 26, but are preferably unitary and pass through holes drilled through column 26 and plate 42 to which they can be anchored by nuts threaded on the ends of the rod 43 on the under side of plate 42. Depending support tubes 44 are adjustably anchored to support plate 42 by bolts 45. Plate 42 is provided with adjustment holes to receive bolts 45 at wider spacing when spacers 37 are used. Tubes 44 are bent downwardly as at 46 and extend to the end 40 of each of the support arms 30 to which they are pinned or otherwise fastened. A spacing bracing strut member 47 is fastened transversely at each of the bends 38 in the arms 30 and adjacent the bends 46 in support tubes 44. Strut members 47 extend far enough on each side of arms 30 and tubes 46 to support sprocket wheels and a canvas top with suitable clearance. It will be seen that the arms 30, support tubes 44 and bracing strut members 47 form a four-arm cantilever structure which forms part of the assembly 29 supported by central column 26.

From each of the points 40 is suspended a substantially vertical member 48 which terminates in a movable member 49 which mounts spaced sprocket wheels 50 and 51. Member 49 is adjustably mounted on a short length of tubing 60 which telescopes into the bottom end of member 48 and can be locked in adjusted position by set screws in sleeve 52 which provide the principal conveyor chain adjustment. The upper end of each member 48 has attached thereto another cross-bar 53 which mounts spaced sprockets 54 and 55 just below the joint 40. Sprocket wheels 54 and 55 are aligned with sprockets 50 and 51 so that a conveyor chain 56 having fixed thereto spring pressed tobacco bundle holding clips 57 can be strung therearound with the descending and ascending portions of the conveyor chain 56 between the pairs of sprocket wheels and substantially parallel. These two parallel sections of chain are partially surrounded by a guard panel 58 with recessed channels 59 in which conveyor chain 56 can run enclosed on three sides and with the clips 57 exposed and firmly held in position on the conveyor chain. The construction of the clips 57 and their mounting on conveyor chain 56 is disclosed in detail in U.S. Patent No. 3,034,664.

The guard panel 58 and its recessed channels 59 not only provide a safety factor in keeping a worker's fingers free of the chain and sprocket wheels adjacent the primer's station, but they also permit the chain 56 to be run loosely without sagging or interference in this area. As a result the conveyor chain 56 does not bind and can be operated with less power and longer chain life, but even more important, the chain may be run so loosely on the sprocket wheels that if an operator's fingers should by some mischance be carried into and around the sprocket wheel it will be bruised but not broken or cut off, as can happen when the conveyor chains are tight.

Also adjustably carried by each depending member 40 is a footrest, just high enough that it clears the ground comfortably when in use with a primer's feet resting on the cross bar 62. Foot bar 62 is mounted on the end of a tube 63 which is fastened to the depending member 40 by a sleeve 61 in which the tube 63 slides for adjustment and is fixed in at a desired level by set screws in the sleeve 61 which bear upon the tube 63. The lower part of tube 63 is preferably bent at right angles forward of the depending member 40 so as to allow adequate room for the primer's feet and position the lower loop of conveyor chain 56 with its clips 57 within easy reach so that bundles of tobacco may be readily inserted with their stems into the clips.

The pairs of points 40 along the length or longer dimension of assembly 29 are connected by a long brace bar 64 which extends beyond them. Parallel with each brace bar 64 and fifteen to eighteen inches farther away from platform 20, is a rod 65, connected to its respective brace bar 64 by a number of short, horizontal bars 66 and 67. The bars 66 are of heavier tubing than bars 67 and support the primer seats 68 close to the ground and behind the foot rests 62 and guard panel 58, so that a primer seated therein can ride with its legs substantially parallel to the ground and within easy reach of the clips 57 on conveyor chain 56. Seats 68 are mounted on a specially shaped tubular member 69 having a relatively long back portion the bottom of which is bent at right angles to receive seat 68 and the top is bent in the same direction to permit suspension from two spaced chains adjustably attached to bars 66. This freely swinging fully adjustable seat suspension is described in greater detail in my U.S. Patent No. 3,034,664.

Conveyor chains 56 pass close to the primer's position, through guide channel 59, around sprocket wheel 55, sprocket wheel 71 mounted on the lower end of strut member 47, around sprocket wheel 72 mounted on shaft 73 and return around sprocket wheel 74 mounted on the upper part of strut 47, to sprocket wheel 54 and the guide channel 59 on the opposite side of guard panel 58. Power is applied to conveyor chain 56 by sprocket wheel 72 and shaft 73 which has sprocket wheel 75 keyed thereon.

Sprocket wheel 75 is driven by chain 76 which passes over sprocket wheel 77 on shaft 78, idler sprocket wheel 79 on shaft 80, and idler sprocket wheel 81 on shaft 82 which is adjustably mounted on bracket 110 on the upper part 32 of central column 26. The shaft 78 is driven by chain 83 which goes around sprocket wheel 84, idler wheel 85, idler wheel 86 and 87 to sprocket 88 on variable speed drive 89. Shaft 78 distributes power to the four conveyor chain systems A, B, C and D, which extend radially from central column 26 and may be rotated bodily therewith, as will be explained below. System A is driven by sprocket wheel 72 on shaft 73 and chain 56. System B has a shaft 90 which is driven by shaft 73 through rounded bevel gears 91 which mate and transmit power satisfactorily without the need of precision mounting required by the usual machine. Shaft 91 then drives the conveyor chain 56 with its spring pressed clips 57 of radial conveyor system B.

Shaft 78 has a sprocket wheel 92 keyed thereon which drives sprocket wheel 93 on shaft 94 of System B through chain 95. Shaft 94 drives sprocket wheel 96 and the conveyor chain 56 of system C. System D is driven off shaft 94 through a pair of rounded bevel gears 97 which transmit power to shaft 98, sprocket wheel 99 and the system D conveyor chain 56.

The top of central column 26 mounts a transverse ridge pole or member 100 which supports awning 101. Awning 101 is anchored at each end to rods 65 and is supported with ample clearance above the four conveyor systems by rods 102 mounted on the upper ends of the respective strut members 47. The ends of rods 102, ridge pole 100 and rods 65 are braced by connecting rods 103 at each open end of the awning 101 to provide a strong unitary structure capable of rotation as a whole and to give a finished appearance.

Figure 2:
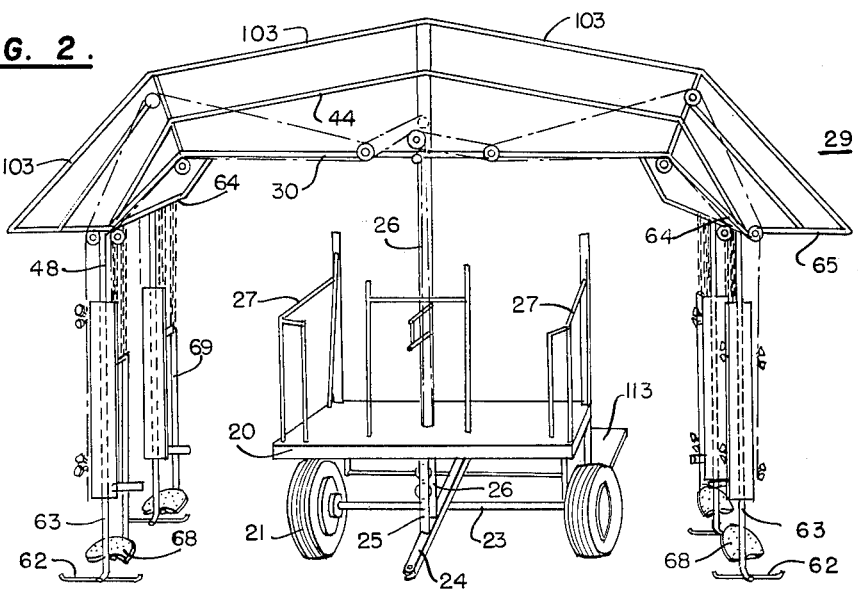
FIGURE 2 is a front perspective view of a harvester according to the invention.

The entire super structure arrangement 29, including the four conveyor systems, with their respective primer seats and the roof assembly, may be rotated through ninety degrees by loosening set screw 34 and swinging it around with channel 31 riding on the upper end of large portion 33 of central column 26. It will be seen that the four conveyor systems readily move around to the position shown in FIGURE 2 with the respective seats 68 and chains 56 fore and aft of the platform 20 to provide a minimum width of vehicle for road travel from one harvesting site to another. The top of column portion 33 may be suitably notched as at 104 to receive a projection from channel 31, so that the assembly 29 remains in one or the other of the two positions when so rotated. This will provide an additional safeguard to set screw 34, during road travel, where danger of collision is greatest. The drive chain 83 is long enough so that it will allow for the ninety degree twist without being loosened or adjusted in any way and is ready for harvesting operation as soon as assembly 29 is rotated with its larger dimension transverse to the direction of travel and the several seats suspended between rows of tobacco.

Variable speed drive 89 is of double cone construction with an intermediate friction drive element and is well known to the art. Equivalent variable torque and speed means are well known. Drive 89 is connected to a power take-off 104 of tractor 105 by a suitable shaft 106 preferably containing differential coupling 107. Shaft 105 is supported by post 108 on tongue 24 which contains a telescoped jack 109 to support tongue 24 and platform 20 level when the harvester is not coupled to a tractor.

At the rear of platform 20 are mounted a pair of sturdy tubular upright members 111 suitably braced as at 112 to support an eccentric load of an elevator platform 113 on which are placed one or more pallets or racks 114 for receiving tobacco leaves in bulk, leaf bundles strung on tobacco sticks 115 and laid flat, one on top of the other or hung on racks with the leaf bundles hanging down in spaced draped depending position, looped with their stems up. In the drawing, pallet 125 rests on spaced arms 126 of elevator 113. Elevator 113 has two sturdy uprights 116 at its forward corners with rings 117 at their upper ends encircling the tubular member 111. Uprights 116 slide on plates 118, depending from the rear corners of platform 20 and suitably braced to maintain a heavy load on elevator 113. Rings 117 slide up and down uprights 111 as elevator 113 is raised and lowered by means of cable 119 threaded around pulleys 120 and 121 and cable loops 122 which fasten one on each side of elevator 113. The bight 123 of cable 119 is fastened to the shackle of movable pulley 124. A differential windlass 127, having a part 128 of smaller diameter and a part 129 of larger diameter, is provided with a cable 130 which passes around movable pulley 124 and has one end around small diameter part 128 and the other around larger diameter part 129. When the differential windlass 127 is turned by a crank 131 a very substantial force is exerted on cable 119 to lift elevator 113 with loaded pallets or racks 114, 125.

A spring loaded brake 132 prevents free rotation of windlass 127, so that elevator 113 is securely held in position when loaded. Brake 132 has a fixed part 133 and a spring biased part 134 which may rotate relative thereto over teeth 135. Upon release of dog 136 both parts of brake 132 may rotate to lower elevator 113; if desired, a worm drive may be provided for crank 131 with a low lead such that it is self-locking and crank 131 must be rotated to raise or to lower elevator 113.

A tobacco stick holder and advancing means 70 is provided for each system A–D. They are mounted on posts 142 on platform 20 and are adjustable in height to suit individual workers or loopers. A movable tube 137 rides loosely between two pairs of rollers 138 mounted in housing 139. A U-shaped support 140 at each end of tube 137 supports a tobacco stick 115 in horizontal position so that bundles of tobacco leaves may be easily looped or strug thereon by means of tying cord or string, the bundles held in draped depending position, on alternate sides of the stick 115 with their stems up. As the stick 115 begins to fill with draped bundles at one end, the tube 137 is advanced step-by-step by a linkage 141 operated by treadle 143 and chain 144 which pull down lever 145 which is spring biased in raised position. Linkage 141 engages tube 137 and advances it an amount which can be adjusted by attaching chain 144 in one of several holes 146 in the end of lever 145. As tube 137 is advanced incrementally, it carries stick 115 partially filled with looped tobacco bundles along with it so that the loops need not reach too far when stringing bundles and is thus able to maintain the rythm of the looping operation, which is important when heavy yields are being harvested.

*Operation*

The harvester is checked for freedom and tension of conveyor chains 56 of all four systems and chain 83. Suitable adjustment is made by moving idler pulleys at sleeve 52, bracket 110 and pulley 85. An ample supply of tobacco sticks 115 is placed in bins 28. Crank 131 is rotated to raise elevator 113 with empty pallets or racks 114, 125 thereon until it is level with platform 20 and locked in position. Tongue 24 is attached to the tractor draw bar and shaft 105 is connected to power take-off 104. Jack 109 is raised. If the harvester is to be driven along a highway, the assembly 29 is rotated to the position shown in FIGURE 2A and locked in position with set screw 34. If desired, tie rods (not shown) may be used to anchor assembly 29 to the corners of platform 20 to aid set screw 34 and notches 104 to maintain the position of the assembly 29 against accidental displacement while traveling. Once in the field the assembly 29 is turned with its longest dimension transverse to the tractor movement. The systems A–D are checked for position between rows and if necessary spacers 37 are inserted and bolts 45 adjusted for row width. The primers adjust their seats 68 and foot rests 62 for ground clearance and position. The loopers adjust their assemblies 70 and place a stick 115 in each of the pairs of U-shaped members 140.

The tractor moves down the vacant row at about a tenth of a mile and hour with a chain 56 of all systems A–D operating. The primers in their seats 68 are able to reach the ripe leaves and remove them from their stalks easily. Seats 68 can be swung on their chains to enable the primers to weave back and forth between the rows as necessary to reach individual ripe leaves. When the primer has gathered from four to six leaves and formed a bundle, he inserts the bunched stems into the nearest spring pressed clip 57 which conveys the bundles with draped depending leaves above the platform 20 to a point near the respective stick holder and advancer 70 for the particular system A–D. At this point the bundles are removed from the successive clips 57 and strung with tying cord on alternate sides of a stick 115 lying in U-shaped holder 140. As the stick 115 fills it is advanced as needed by depressing treadle 143 which is spring returned. Full sticks 115 are tied off and either hung on a rack such as 114 on elevator 113 where they are draped as shown in FIGURE 1 of U.S. Patent No. 2,786,585 or laid flat on a pallet 125 as shown in FIGURE 1A of that patent. The elements 114 may also be taken to represent standards intended to hold piled bundles on a pallet 125.

When elevator 11 is full, dog 136 is released and the loaded elevator is lowered to ground level where the loaded pallets 125 or racks 114 are removed by lift fork and placed on a trailer by which they are taken to a barn for storage and airing. The elevator 113 is then raised level with platform 20 and the operation repeated. Loopers are able to reach fresh sticks 115 from the central supply 28 easily. When the heavester is used for bulk harvesting the sticks 115, central supply 28 and holder 70 may be eliminated and the tobacco leaves are piled in baskets and placed on pallets 125 or are merely piled on the pallets. For bulk harvesting the number of platform works can be reduced and the spring pressed clips 57 and conveyor chains 56 supplied with automatic trip releases as shown in U.S. Patent No. 3,034,664.

In the form of the invention shown in FIGURES 11, 11A, 11B and 11C, central area delivery and automatic release is achieved with belts instead of spring pressed clips mounted on conveyor chains. Rotatable central column 26 mounts four radial arms 300, one for each system A, B, C and D, which are supported by rods 301. The belts are mounted in groups of three on central pulleys 302, 304 and 306. The two outer belts 307 and 309 support the leaf bundles from the same side and are on the bottom during the final part of the delivery. Belt 307 runs around pulley 304 over pulley 305, around pulley 322 and over pulley 316. Belt 309 runs around pulley 306, over pulley 310, around pulley 318 and over pulley 308. Upper belt 303 runs around pulley 302 and 314 and overlaps slightly with its companion belt 311 which runs around pulleys 324 and 320. As shown in FIGURE 11B, pulleys 314 and 324 are bolted together. Pulley 302 is keyed to shaft 327 as is also gear 326. Pulleys 304, 306 and gear 328 are keyed to shaft 329 with gear 328 meshing with gear 326.

The drive for the belt system is from shaft 78 as shown in FIGURE 11A. Gears 326 and 328 drive belts 303 on one side and belts 307 and 309 on other in the proper direction to grip and transport leaf bundles. Belt 303 drives pulleys 314, 324 and thereby belt 311. Bundles of leaves are inserted by hand between belt 311 on the outside and belts 307 and 309 on the inside at pulleys 318, 320 and 322. Belts 311 and 303 overlap slightly at pulleys 314 and 324 so that the bundles are constantly held until released at pulleys 302, 304 and 306 and dropped in a pile at the foot of central column 26. Pulley 302 may be raised slightly as shown in FIGURE 11, to facilitate handling at the delivery end of desired. Pulleys 314 and 324 may be mounted on separate shafts as shown in FIGURE 11 to provide a less abrupt cornering. With this arrangement pulley 324 is driven from pulley 314 by a supplemental belt not shown. The belts which transport the leaves or bundles may be provided with teeth on spaced gripper projections 330 as shown in FIGURE 11C so that individual leaves can be held if the bundle being harvested should spread out.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:
1. In a tobacco harvester, a platform, wheels supporting the platform above the ground and on which the platform may move in a given direction, a frame structure which is considerably longer than it is wide and also being longer than the width of said platform, means for mounting said structure for rotary movement in a plane parallel to the ground to first and second positions where the longitudinal dimension of the structure is respectively in line with and perpendicular to said direction, said structure at each end thereof having portions extending down to form a lower support portion, a crop-picker's seat mounted on said frame structure adjacent each of said lower portions, and conveyor means for each seat, each said conveyor means being carried by said structure and extending from adjacent its complementary seat upwardly along said lower portion and thence inwardly to a position above said platform, each said conveyor means including means for conveying tobacco leaves, and driving means for operating the conveyor, said driving means extending along a portion of said means for mounting said structure to the conveyor whereby said structure and said conveyor means may be rotated while said driving means is connected to said conveying means.

2. In the tobacco harvester of claim 1, a tobacco stick supporting and advancing device mounted on said platform, said tobacco stick supporting and advancing device comprising in combination, a frame, a rod member mounted for movement on said frame, tobacco stick supporting means carried by said rod member, and means to advance said rod member with a tobacco stick supported thereby step-by-step to position said stick for draping tobacco bundles thereon.

3. In the tobacco harvester of claim 1, a series of guide wheels mounted on said structure and guiding and holding said conveyor means, said conveyor means being very loosely held by said guide wheels when said structure is in said first position, whereby said structure may be rotated to said second position without directly altering the conveyor means and whereby when said structure is in said second position an accidental insertion of an extremity of the crop picker will result in a minimum of injury to the crop picker.

4. In the tobacco harvester of claim 3, said conveyor means comprising a series of chains and said guide wheels comprising sprocket wheels.

5. In the tobacco harvester of claim 3, said conveyor means comprising a series of flexible belts and said guide wheels comprising pulley wheels.

6. In the tobacco harvester of claim 1, said means for mounting said structure comprising a centrally located support about which said structure is rotated, said structure being completely supported by said support means.

7. In the tobacco harvester of claim 6, said support means comprising a circular shaft.

8. In a harvesting machine, means for receiving the harvest including a frame with wheels on which the frame may move in a given direction whereby the machine may move adjacent the crop to be harvested, a structure which is considerably longer than that dimension of said means which is transverse to said direction, the width of said structure being relatively narrow as compared to its length, supporting means for said structure rotatably mounting the same above said first-named means and permitting the structure to be rotated to a first position where its longer dimension is in said given direction to thus enable the harvester to be transported with minimum width and also permitting the structure to be rotated to a second position where its longer dimension is transverse to said given direction, said structure being a rigid one throughout its length so that when rotated to said first position the opposite ends of the structure are respectively in front of and to the rear of said first-named means, said structure at each end thereof having a portion extending down a substantial extent to form a lower support portion, a crop-picker's seat mounted on said structure adjacent each of said lower portions, conveyor means carried by said structure and extending upwardly along each said lower portion and thence inwardly along said structure to a position above said first-named means, said conveyor means including means for conveying the harvested crop, and driving means for operating said conveyor means, said driving means extending along a portion of said supporting means whereby said structure and said conveyor means may be rotated while said driving means is connected to said conveying means.

9. In the harvesting machine of claim 8, said structure including a first adjustment means for adjusting the height of said structure, and a second adjustment means for altering the vertical position of each of said crop-picker's seats.

10. In the harvesting machine of claim 9, said first adjustment means comprising a telescoping adjustment.

11. In the harvesting machine of claim 8, said structure including a first adjustment means for adjusting the length of said structure to accommodate various row widths when said structure is in said second position and a second adjustment means for varying the tension of said conveyor means.

12. In the harvesting machine of claim 11, said first adjustment means comprising a removable structural insert and said second adjustment means comprising a telescoping arrangement.

References Cited by the Examiner

UNITED STATES PATENTS

| | | | |
|---|---|---|---|
| 1,478,812 | 12/1923 | Barene | 198—126 |
| 2,511,672 | 6/1950 | Kemmer | 198—126 |
| 2,732,961 | 6/1956 | Grvin | 214—83.36 |
| 2,797,827 | 7/1957 | Mish | 214—83.1 |
| 2,798,623 | 7/1957 | Girardi | 214—83.1 |
| 2,904,194 | 9/1959 | Jones et al. | 214—5.5 |
| 2,930,494 | 3/1960 | Frushour et al. | 214—5.5 |
| 2,952,370 | 9/1960 | Long | 214—5.5 |
| 3,034,664 | 5/1962 | Davis | 214—5.5 |
| 3,083,517 | 4/1963 | Wilson | 56—27.5 |

GERALD M. FORLENZA, *Primary Examiner.*

MORRIS TEMIN, *Examiner.*

R. B. JOHNSON, *Assistant Examiner.*